(12) United States Patent
Ono

(10) Patent No.: US 7,672,636 B2
(45) Date of Patent: Mar. 2, 2010

(54) IMAGE READER FOR IMAGE-FORMING DEVICE

(75) Inventor: Akehiro Ono, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 252 days.

(21) Appl. No.: 11/285,288

(22) Filed: Nov. 23, 2005

(65) Prior Publication Data

US 2006/0114523 A1    Jun. 1, 2006

(30) Foreign Application Priority Data

Nov. 26, 2004  (JP)  ............................. 2004-342735

(51) Int. Cl.
*G03G 15/00* (2006.01)

(52) U.S. Cl. ..................... 399/380; 399/377; 399/378; 399/379

(58) Field of Classification Search ................ 399/380, 399/107, 377, 378, 379; 358/474; 382/312; 355/75

See application file for complete search history.

(56) References Cited

U.S. PATENT DOCUMENTS

| 5,266,781 | A  | * | 11/1993 | Warwick et al. ............. 235/375 |
| 6,405,017 | B1 | * | 6/2002  | Takahashi et al. ........... 399/380 |
| 7,079,294 | B1 |   | 7/2006  | Nakagawa et al. |
| 2005/0152008 | A1 | * | 7/2005 | Seo ............................. 358/474 |

FOREIGN PATENT DOCUMENTS

| JP | 4-151645 A    | 5/1992  |
| JP | 5-127267      | 5/1993  |
| JP | H8-9721       | 3/1996  |
| JP | 10-20416      | 1/1998  |
| JP | 2994561 B2    | 12/1999 |
| JP | 2001024843    | 1/2001  |
| JP | 2001024849 A  | 1/2001  |
| JP | 2001-75194 A  | 3/2001  |
| JP | 2002-111964 A | 4/2002  |
| JP | 2002-20937    | 7/2002  |
| JP | 2002-374395   | 12/2002 |
| JP | 2003-140278   | 5/2003  |
| JP | 2004-219717 A | 8/2004  |

OTHER PUBLICATIONS

Office Action issued in corresponding Japanese Patent Application No. 2004-342735 on Jan. 8, 2009. Partial translation only.
Office Action issued Mar. 26, 2009 in corresponding Japanese Application No. 2004-342735.
Notification of First Office Action dated Apr. 13, 2007 in Chinese Application No. CN2005101260312 and English translation thereof.

* cited by examiner

*Primary Examiner*—Judy Nguyen
*Assistant Examiner*—Andy L Pham
(74) *Attorney, Agent, or Firm*—Banner & Witcoff, Ltd

(57) ABSTRACT

An image reader including a main body with a document bed for supporting an original document; and a document cover rotatably supported at one edge with respect to the main body and capable of rotating between a closed position for covering the document bed and an open position for exposing the document bed. The document cover has a main cover body and a document pressing plate formed of a synthetic resin. The pressing plate is supported on the main cover body with vertical clearance (in a direction orthogonal to the surface of the pressing plate) through the engagement of engaging pieces having through-holes. When the document cover is in the closed position, pressing parts press the center part of the pressing plate against the document bed.

18 Claims, 12 Drawing Sheets

FIG.1
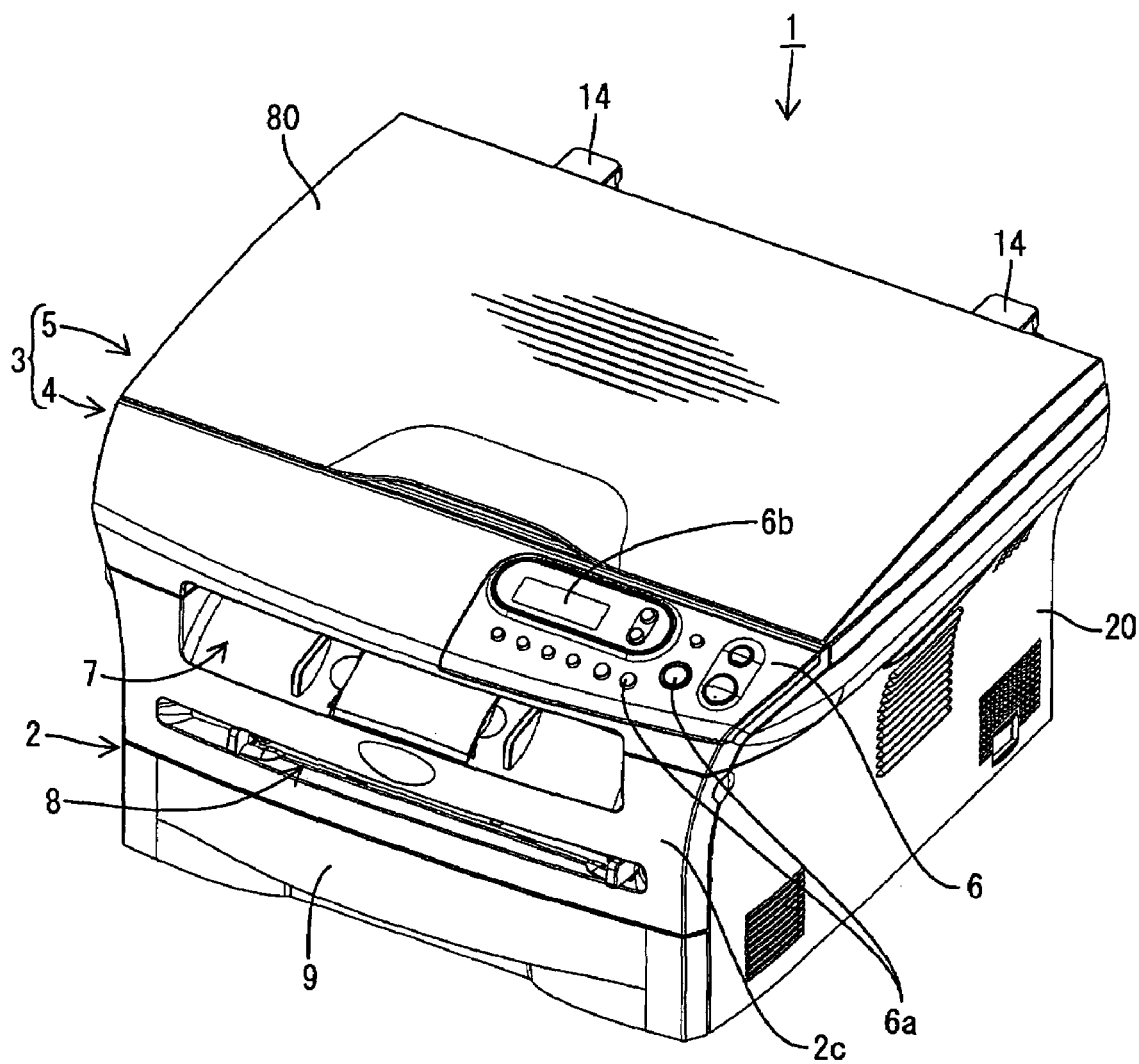
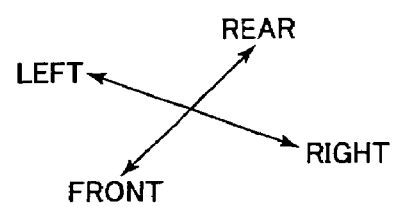

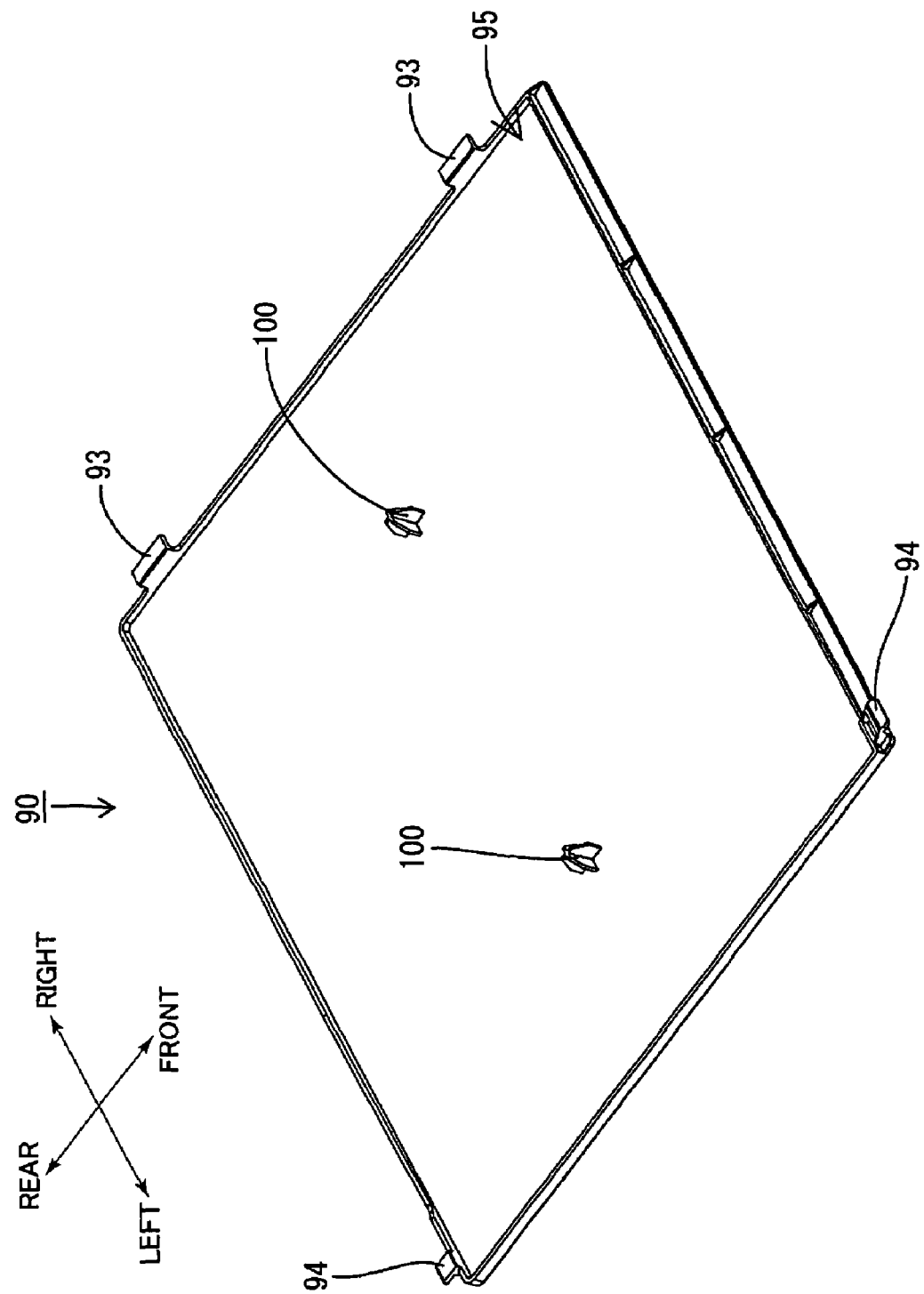

IMAGE READER FOR IMAGE-FORMING DEVICE

CROSS REFERENCE TO RELATED APPLICATION

The present disclosure relates to the subject matter contained in Japanese Patent Application No. 2004-342735 field Nov. 26, 2004, which is incorporated herein by reference in its entirety.

TECHNICAL FIELD

Background

One aspect of the invention relates to an image reader, and an image-forming device provided with the image reader. One aspect of the invention may relate to an image reader having a document pressing plate for pressing against an original document placed on a document support surface.

An image-forming device having a scanner function, for example, is well known in the art. One such image-forming device includes a document support surface formed of a glass plate or the like and provided on the top surface on the main body of the image-forming device, and an optical scanning device disposed beneath the document support surface for reading image data from an original document placed on top of the document support surface. With this configuration, the original document cannot be read properly if there are bends or curls in the document that raise part of the document off the document support surface. Therefore, the image-forming device also includes a document cover capable of opening and closing over the document support surface to expose or cover the same, and a document pressing plate provided on the surface of the cover opposing the document support surface. When the document cover is closed, the document pressing plate presses the original document closely against the document support surface.

In an image-forming device disclosed in Japanese patent application publication No. 2003-140278, the document pressing plate is formed of a flexible sponge to ensure that the original document is pressed closely against the document support surface. This document pressing plate formed of sponge material is affixed to the cover by an adhesive or the like applied to areas along the periphery of the document pressing plate.

SUMMARY

However, in recent years there has been a demand for lowering the cost of electronic goods, including image-forming devices. Thus, from a cost perspective, it is desirable to use a member formed of synthetic resin for the document pressing plate, because synthetic resin costs less than sponge material.

However, generally synthetic resin members are less flexible than sponge material. Moreover, due to circumstances involving the injection molding process, it is difficult to form synthetic resin members with perfectly flat surfaces. Therefore, it has been difficult to produce a document pressing plate of synthetic resin that can reliably press an original document tightly against the document support surface simply by affixing the plate to the cover, as is done with the sponge material. Further, the cover itself is also formed of synthetic resin and may be slightly warped. Hence, even if it were possible to form the document pressing plate with perfectly flat surfaces, warping in the cover may make it impossible to press the original document tightly against the document support surface.

In view of the foregoing, it is an object of one aspect of the present invention to provide an image reader and an image-forming device having a document pressing plate formed of a synthetic resin that is capable of tightly pressing an original document against a document support surface.

To achieve the above and other objects, one aspect of the present invention may provide an image reader including a main body and a document cover. The main body has a document support surface for supporting an original document. The document cover is rotatably supported at one edge of the main body and capable of rotating between a closed position for covering the document support surface and an open position for exposing the document support surface. The document cover includes a main cover body, a document pressing plate, a supporting unit, and a plurality of pressing parts. The document pressing plate is provided on an opposing surface of the main cover body that opposes the document support surface when the document cover is in the closed position. The document pressing plate has a pressing surface that opposes the document support surface when the document cover is in the closed position. The supporting unit supports the document pressing plate on the main cover body. The supporting unit includes a first plurality of engaging protrusions and a first plurality of engagement receiving parts. The first plurality of engaging protrusions are provided on either one of the main cover body and the document pressing plate. The first plurality of engagement receiving parts are provided on the other of the main cover body and the document pressing plate for engaging with the first plurality of engaging protrusions with clearance in at least a direction orthogonal to the pressing surface.

The plurality of pressing parts is disposed on at least one of the main cover body, in a region opposing the document pressing plate, and the document pressing plate. The plurality of pressing parts presses against the other of the main cover body and the document pressing plate in the direction that the main cover body and document pressing plate oppose one another when the document cover is in the closed position.

In another aspect of the invention, there may be provided a image-forming apparatus including the above-described image reader and an image-forming unit that forms images on a recording medium based on image data read by the image reader.

BRIEF DESCRIPTION OF THE DRAWINGS

One aspect of the invention may be more readily described with reference to the accompanying drawings:

FIG. 1 is a perspective view of a multifunction device;

FIG. 12 is a perspective view showing a pressing plate according to a variation of the preferred embodiment from the side opposing the main cover body.

DETAILED DESCRIPTION

An image-forming device according to a preferred embodiment of one aspect of the present invention will be described with reference to FIGS. 1 through 11. The image-forming device according to the preferred embodiment is a multifunction device 1 having a printer function, scanner function, and the like.

As shown in FIG. 1, the multifunction device 1 includes an image-forming unit 2 and a scanning unit 3.

Figure 3:
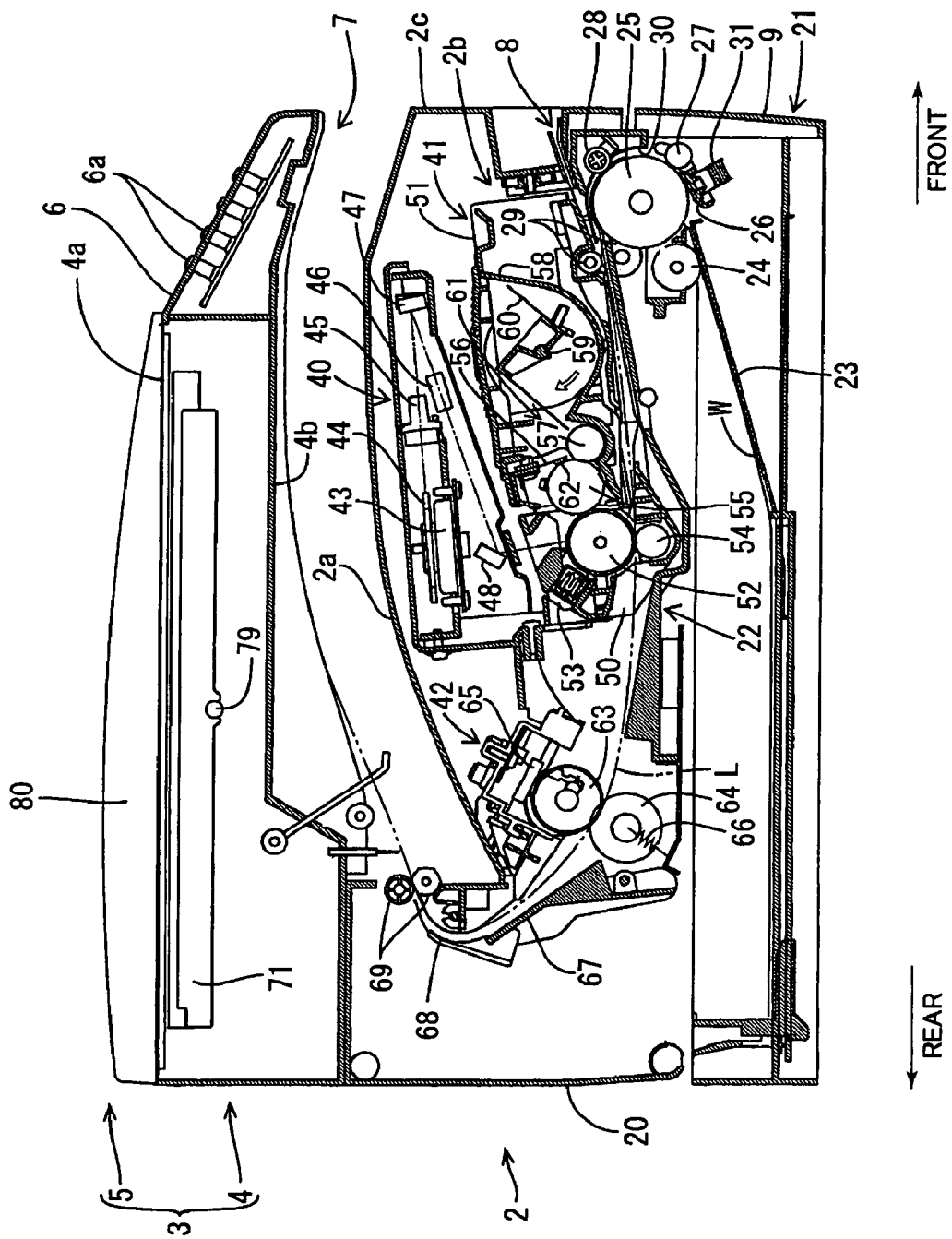
FIG. 3 is a side cross-sectional view of the multifunction device.

The image-forming unit 2 includes a casing 20 that primarily accommodates a feeder unit 21 and an image-forming unit 22 (both shown in FIG. 3). A discharge tray 2a (see FIG. 3) is provided on top of the image-forming unit 2, and the scanning unit 3 is disposed above the discharge tray 2a with a gap formed between the two.

The scanning unit 3 includes a main body 4, and a rectangular-shaped document cover 5. The main body 4 has a reading unit 70 (see FIG. 3) for reading an image from an original M, and a rectangular-shaped document bed 4a (see FIG. 2) disposed on the top surface of the main body 4. The document cover 5 is capable of opening and closing over the document bed 4a so as to expose or cover the same.

A control panel 6 is provided on the front end of the main body 4 (the lower left side in FIG. 1). The control panel 6 includes various operating buttons 6a and a liquid crystal display 6b. A paper retrieval opening 7 is formed between the bottom of the control panel 6 and the discharge tray 2a, configuring what is referred to as a mid-body paper discharge system. A manual feed opening 8 is formed in the image-forming unit 2 below the paper retrieval opening 7 as a slit-shaped opening extending horizontally. A paper cassette 9 is detachably mounted below the manual feed opening 8 from the front side of the image-forming unit 2, the same side on which the control panel 6 is provided. In the following description, the side of the multifunction device 1 on which the control panel 6 and paper cassette 9 are provided (the lower left surface in FIG. 1) will be referred to as the "front," while the opposite side (the upper right direction in FIG. 1) will be referred to as the "rear." Further, a side facing the lower right in FIG. 1 will be referred to as the "right," while a side facing the upper left in FIG. 1 will be referred to as the "left."

Figure 2:
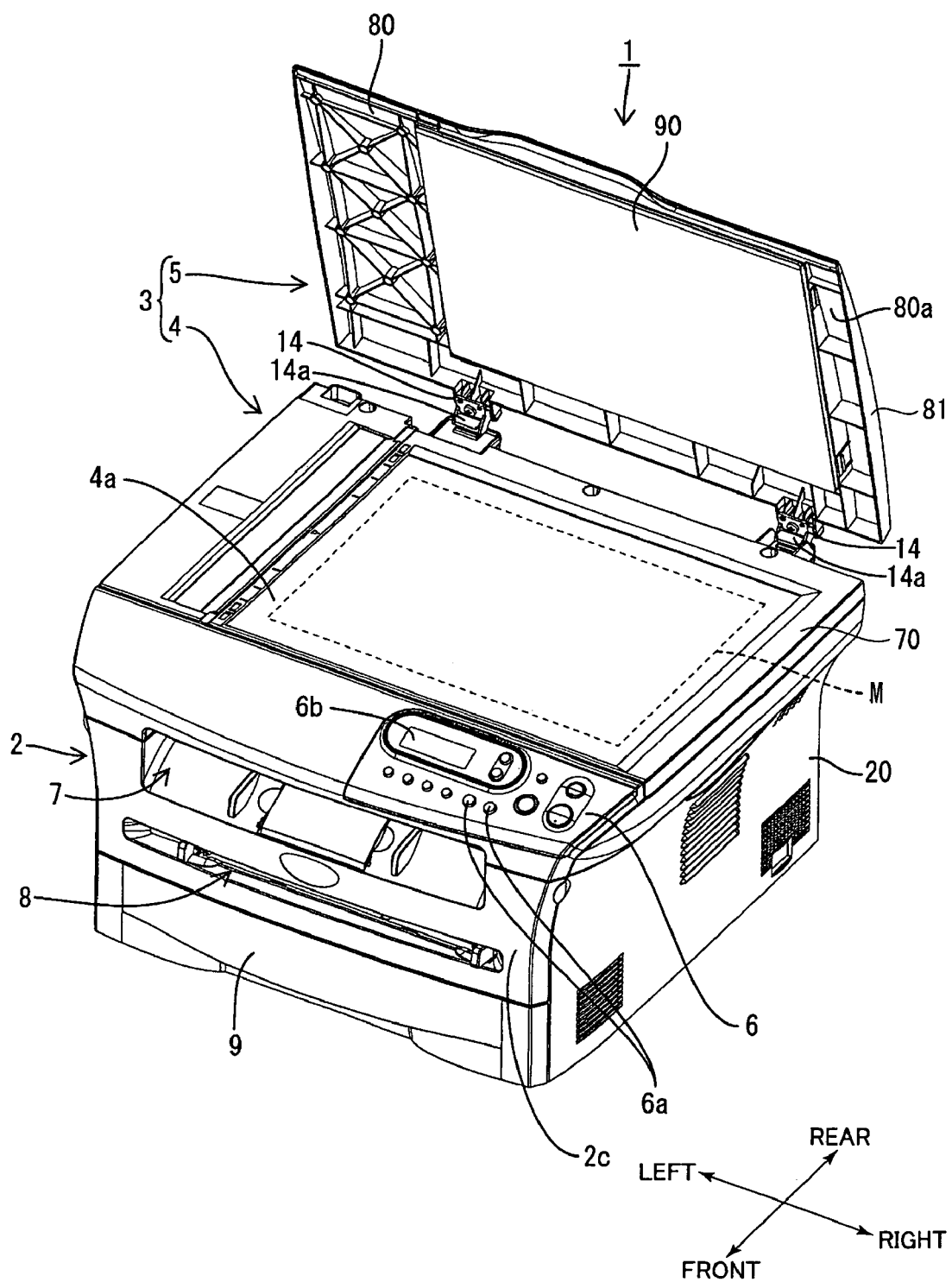
FIG. 2 is a perspective view of the multifunction device in FIG. 1 when a document cover is in an open state.

As shown in FIG. 2, the rear edge of the document cover 5 is fixed to the rear edge of the main body 4 on the top surface thereof by hinges 14. The hinges 14 rotate about rotational shafts 14a. Hence, the document cover 5 is capable of rotating about the rotational shafts 14a via the hinges 14. When the document cover 5 is opened, the document bed 4a is exposed on the top surface of the main body 4.

Next, the structure of the image-forming unit 2 will be described with reference to FIG. 3. As described above, the feeder unit 21 and image-forming unit 22 are provided inside the casing 20. The feeder unit 21 functions to feed sheets of a paper W into the image-forming unit 22. The image-forming unit 22 forms prescribed images on the paper W received from the feeder unit 21. After the image-forming unit 22 has formed an image on the paper W, the paper W is discharged and maintained on the discharge tray 2a provided on top of the image-forming unit 22.

The feeder unit 21 includes the paper cassette 9, a paper-pressing plate 23, a pickup roller 24, a feeding roller 25, a separating pad 26, a pinch roller 27, a paper dust roller 28, a pair of registration rollers 29, and a spring 31. The paper-pressing plate 23 is disposed inside the paper cassette 9. The pickup roller 24 is disposed above the front end of the paper cassette 9. The feeding roller 25 is disposed front side of the pickup roller 24. The pinch roller 27 is disposed in confrontation with the feeding roller 25. The paper dust roller 28 is disposed above the front side of the feeding roller 25 and in confrontation with the same. The registration roller 29 is disposed downstream of the paper dust roller 28 with respect to a conveying direction in which the paper W is conveyed.

The feeder unit 21 also includes an arc-shaped guide member 30 disposed above and to the front of the feeding roller 25 that follows the outer periphery of the feeding roller 25. The guide member 30 receives the paper W fed forward from the front end of the paper cassette 9 and guides the paper W along an arc-shaped path so that the paper W is redirected toward the rear of the multifunction device 1. In this way, the paper W is conveyed toward the image-forming unit 22 provided above the paper cassette 9.

The paper cassette 9 is detachably mounted in a lower section of the casing 20 and accommodates a plurality of sheets of the paper W stacked therein. The paper cassette 9 can be pulled out of the multifunction device 1 through the front side thereof in order to load more paper W in the paper cassette 9. When the paper cassette 9 is pulled out of the multifunction device 1, the feeder unit 21 separates at a point between the feeding roller 25 and the separating pad 26. The pinch roller 27, separating pad 26, and the spring 31 disposed on the underside of the separating pad 26 are pulled out together with the paper cassette 9.

The rear end of the paper-pressing plate 23 is pivotably supported in the paper cassette 9 so that the front end of the paper-pressing plate 23 can move vertically. A spring (not shown) is disposed on the underside of the paper-pressing plate 23 for urging the front end of the paper-pressing plate 23 upward. As the amount of paper W stacked on the paper-pressing plate 23 increases, the paper-pressing plate 23 pivots downward about the rear end thereof, opposing the urging force of the spring.

The pickup roller 24 is positioned so as to contact the topmost sheet of the paper W stacked in the paper cassette 9. The pickup roller 24 functions to pickup and feed the paper W to a position from where the feeding roller 25 can convey the paper W (between the feeding roller 25 and separating pad 26).

The separating pad 26 is disposed in confrontation with the feeding roller 25. The spring 31 disposed on the underside of the separating pad 26 presses the separating pad 26 toward the feeding roller 25. The separating pad 26 functions to prevent a plurality of overlapped sheets of the paper W from being supplied onto the conveying path indicated by the broken line L in FIG. 3. Hence, the paper W that is picked up by the pickup roller 24 comes into contact with the feeding roller 25 and separating pad 26. At this time, the separating pad 26 applies a suitable frictional force to the paper W so as to restrict all but the topmost sheet of paper W when the pickup roller 24 feeds a plurality of sheets to the separating pad 26. As a result, the feeding roller 25 can feed the paper W one sheet at a time.

As the feeding roller 25 conveys the paper W along a path that changes the conveying direction of the paper W by about 180°, the paper dust roller 28 removes paper dust from the paper W. Subsequently, the registration rollers 29 convey the paper W.

The pair of registration rollers 29 disposed downstream of the paper dust roller 28 function to correct misalignment in the sheets of paper W conveyed along the paper-conveying path. This is accomplished with a position sensor (not shown) disposed near the feeding roller 25 for detecting the paper W, and a control system (not shown) for controlling when the registration rollers 29 are driven and halted based on a detection timing of the position sensor. Specifically, the control system drives the registration rollers 29 when the feeding roller 25 is conveying the paper W, and halts the registration rollers 29 when the position sensor detects the leading edge of the paper W. After the paper W contacts the registration rollers 29 and becomes slack, the control device begins driving the registration rollers 29 again in order to convey the paper W to the image-forming unit 22.

The manual feed opening 8 is formed in the multifunction device 1 above and forward of the feeding roller 25 so that the paper W can be directly fed through the front of the multifunction device 1 to the registration rollers 29. Hence, the paper W can be supplied onto the conveying path L without being loaded in the paper cassette 9.

Next, the image-forming unit 22 will be described. The image-forming unit 22 includes a scanning unit 40, a process unit 41, and a fixing unit 42.

The scanning unit 40 is disposed in a top section of the casing 20 and includes a laser light-emitting unit (not shown), a polygon mirror 44 that is rotatably disposed, a polygon motor 43 for driving the polygon mirror 44 to rotate, lenses 45 and 46, and reflecting mirrors 47 and 48. The laser light-emitting unit emits a laser beam based on prescribed image data. The laser beam passes through or is reflected by the polygon mirror 44, lens 45, reflecting mirror 47, lens 46, and reflecting mirror 48 in the order given along a path indicated by alternating dots and dashes in FIG. 3. The laser beam is irradiated in a high-speed scan over the surface of a photosensitive drum 52 described later.

An accommodating section 2b is formed below the discharge tray 2a in the casing 20 for accommodating the process unit 41. The accommodating section 2b is open on the front side of the casing 20. A door 2c is provided so as to be able to open and close over this opening in the accommodating section 2b. The process unit 41 which includes the photosensitive drum 52 is detachably mounted in the main body of the image-forming unit 2 and accommodated in the accommodating section 2b. The operation for mounting and removing the process unit 41 can be performed when the door 2c is rotated open. Further, a gap is formed between the process unit 41 and the scanning unit 40.

The process unit 41 includes a drum cartridge 50 and a developer cartridge 51. The drum cartridge 50 includes the photosensitive drum 52, a Scorotron charger 53, and a transfer roller 54. The developer cartridge 51 includes a developing roller 55, a thickness-regulating blade 56, a toner supply roller 57, and a toner box 58. The developer cartridge 51 is detachably mounted on the drum cartridge 50.

The toner box 58 is filled with toner. A rotational shaft 59 is disposed in the center of the toner box 58. An agitator 60 is provided on the rotational shaft 59 and is capable of rotating in a direction indicated by the arrow (clockwise in FIG. 3). A toner supply opening 61 is formed in the rear side of the toner box 58. The rotating agitator 60 stirs the toner in the toner box 58, discharging some of the toner through the toner supply opening 61.

The toner supply roller 57 is disposed on the rear side of the toner supply opening 61 and is capable of rotating in the counterclockwise direction in FIG. 3. The developing roller 55 is disposed in confrontation with the toner supply roller 57 and is also capable of rotating in the counterclockwise direction. The toner supply roller 57 and developing roller 55 contact each other with pressure so that each is compressed to a degree.

The toner supply roller 57 is configured of a metal roller shaft covered by a roller that is formed of an electrically conductive foam material. The developing roller 55 is configured of a metal roller shaft covered by a roller that is formed of an electrically conductive rubber material having no magnetic properties. More specifically, the roller portion of the developing roller 55 is formed of an electrically conductive urethane rubber or silicon rubber including fine carbon particles or the like, the surface of which rubber is coated with a urethane rubber or silicon rubber including fluorine. During a developing operation, a developing bias is applied to the developing roller 55.

The thickness-regulating blade 56 is disposed near the developing roller 55. The thickness-regulating blade 56 is configured of a main blade member formed of a metal leaf spring member, and a pressing part 62 provided on the distal end of the main blade member. The pressing part 62 has a semicircular cross-section and is formed of an insulating silicon rubber. The thickness-regulating blade 56 is supported on the developer cartridge 51 so that the elastic force of the main blade member causes the pressing part 62 to contact the developing roller 55 with pressure.

Toner discharged through the toner supply opening 61 by the rotation of the agitator 60 is supplied onto the developing roller 55 by the rotation of the toner supply roller 57. At this time, the toner is positively tribocharged between the toner supply roller 57 and the developing roller 55. As the developing roller 55 continues to rotate, the toner supplied onto the surface of the developing roller 55 passes between the pressing part 62 of the thickness-regulating blade 56 and the developing roller 55, at which time the toner is further tribocharged and is smoothed so that a thin layer of uniform thickness is carried on the developing roller 55.

The photosensitive drum 52 is disposed along the rear side of the developing roller 55 and is capable of rotating clockwise in FIG. 3 while in confrontation with the developing roller 55. The photosensitive drum 52 includes a main drum body that is grounded, and a surface layer formed of a positive charging photosensitive layer of polycarbonate or the like. A main motor (not shown) generates a motive force for driving the photosensitive drum 52 to rotate.

The charger 53 is disposed in opposition to the photosensitive drum 52, but separated a prescribed distance therefrom and is positioned about 30° above the horizontal along a radial direction of the photosensitive drum 52. The charger 53 is a positive charging Scorotron charger having a charging wire formed of tungsten or the like from which a corona discharge is generated. The charger 53 functions to charge the entire surface of the photosensitive drum 52 with a uniform positive polarity.

As the photosensitive drum 52 rotates, the charger 53 charges the surface of the photosensitive drum 52 with a uniform positive polarity. Subsequently, the scanning unit 40 irradiates a laser beam in a high-speed scan to form an electrostatic latent image on the surface of the photosensitive drum 52 based on prescribed image data.

Next, positively charged toner carried on the surface of the developing roller 55 comes into contact with the photosensitive drum 52 as the developing roller 55 rotates and is supplied to areas on the surface of the positively charged photosensitive drum 52 that were exposed to the laser beam and, therefore, have a lower potential. In this way, the latent image on the photosensitive drum 52 is developed into a visible image according to a reverse development process.

The transfer roller 54 is rotatably supported in the drum cartridge 50 at a position below the photosensitive drum 52. The transfer roller 54 is capable of rotating in the counterclockwise direction of FIG. 3 while in confrontation with the photosensitive drum 52. The transfer roller 54 is configured of a metal roller shaft covered by a roller that is formed of a rubber material with ionic conductivity. A forward transfer bias is applied to the transfer roller 54 during a transfer operation. As a consequence, the visible image carried on the surface of the photosensitive drum 52 is transferred onto the paper W as the paper W passes between the photosensitive drum 52 and transfer roller 54.

The fixing unit 42 is disposed downstream of the process unit 41 in the paper-conveying direction (rearward). The fixing unit 42 includes a fixing roller 63, a pressure roller 64 that contacts the fixing roller 63 with pressure, and a thermostat 65.

The fixing roller 63 is formed of metal and accommodates a halogen lamp for generating heat. A spring 66 is provided on the underside of the pressure roller 64 for rotatably pressing the pressure roller 64 toward a rotational axis of the fixing roller 63. The pressure roller 64 follows the rotation of the fixing roller 63 while in close contact with the fixing roller 63 or the paper W.

The thermostat 65 is a bi-metal thermostat, for example, that functions to turn the power of the heater for heating the fixing roller 63 on and off in response to heat generated from the fixing roller 63. In this way, the thermostat 65 prevents the fixing roller 63 from being heated to an abnormally high temperature.

In the fixing unit 42 having this construction, toner transferred onto a sheet of the paper W in the process unit 41 is fixed by heat generated in the fixing roller 63 and pressure provided by the pressure roller 64 as the paper W passes between the fixing roller 63 and pressure roller 64. After the fixing process, the paper W is conveyed along a discharge path leading to the discharge tray 2a on the top surface of the image-forming unit 2. The discharge path is formed by guide members 67 and 68 and leads from the fixing unit 42 to the discharge tray 2a while reversing the conveying direction from a rearward direction to a forward direction. A pair of discharge rollers 69 is disposed at the top of the discharge path for discharging the paper W received from the fixing unit 42 onto the discharge tray 2a. This construction enables high quality images to be formed.

As described above, the scanning unit 3 includes the main body 4 and the document cover 5, and the main body 4 is disposed above the discharge tray 2a of the image-forming unit 2. The main body 4 has a bottom surface 4b that faces and acts as a covering for the discharge tray 2a.

The scanning unit 3 in the preferred embodiment is configured as a flatbed scanner. With a flatbed structure, opening the document cover 5 as shown in FIG. 2 exposes the document bed 4a of the reading unit 70 so that a book or other original document can be placed on the document bed 4a to be scanned.

As shown in FIG. 3, the reading unit 70 includes a contact image sensor (CIS) 71 disposed below the document bed 4a, which is configured of a glass plate. The CIS 71 is a line-type sensor that extends in the front-to-rear direction of the multifunction device 1 and includes a plurality of photodiodes (not shown) aligned in the extended direction of the CIS 71. The CIS 71 has a light source (not shown) for projecting an intense light onto the original M. The light reflected off the original M is received by the individual photodiodes, and the light intensity (brightness) of the reflected light for each pixel in the original M is converted into electric signals. The reading unit 70 includes an A/D converter (not shown) for converting these signals to digital data, enabling an image formed on the original M to be read as image data.

The original M is scanned in the reading unit 70 by placing the original M on the document bed 4a. More specifically, the CIS 71 is moved along the document bed 4a in the left-to-right direction of the multifunction device 1 (the direction orthogonal to the surface of the drawing in FIG. 3) via a shaft 79 that extends in this left-to-right direction in order to scan the original M supported on the document bed 4a. This construction can easily provide pressing parts 84 described later on the document cover 5 in comparison with when the reading unit 70 is provided on the document cover 5.

As described above, the document cover 5 is rotatably supported via the hinges 14 on the rear edge on the top surface of the main body 4 so that the document cover 5 can be rotated between a closed position for covering the document bed 4a, shown in FIG. 1, and an open position for exposing the document bed 4a, shown in FIG. 2. The document cover 5 includes a main cover body 80 and a pressing plate 90 (see FIGS. 2 and 5) disposed on the surface of the document cover 5 that opposes the document bed 4a when the document cover 5 is in the closed position.

Next, the main cover body 80 and the pressing plate 90 will be described with reference to FIGS. 4 through 11. The dotted line shown in FIG. 4 indicates an opposing region E that opposes the pressing plate 90.

Figure 4:
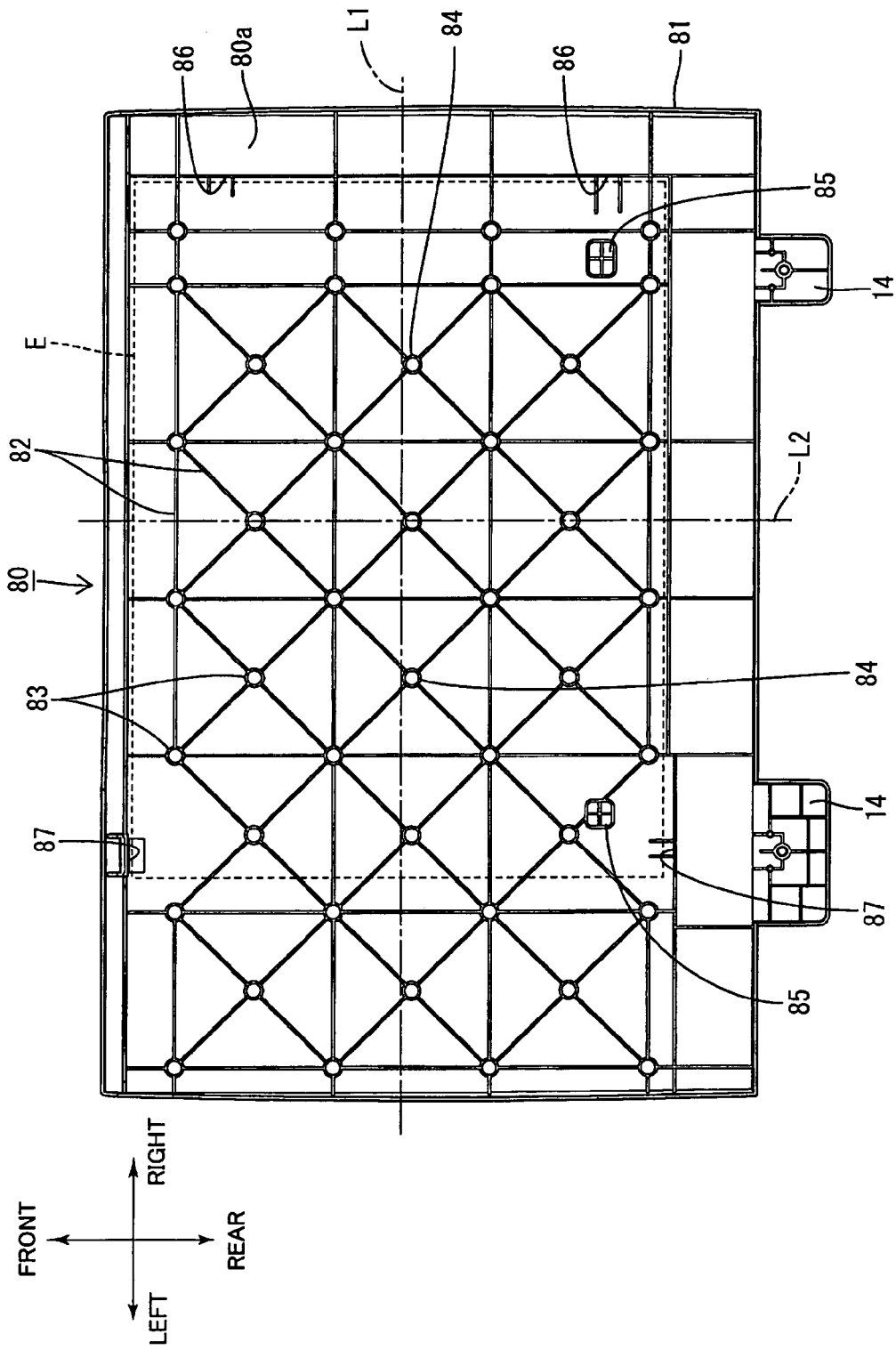
FIG. 4 is a plan view of a main cover body from the side opposing a document support surface on the multifunction device.

The main cover body 80 is molded of a synthetic resin material. As shown in FIG. 4, the main cover body 80 is formed in a rectangular plate shape extending in the left-to-right direction of the multifunction device 1. As shown in FIG. 1, the main cover body 80 is large enough to cover the entire top surface of the main body 4, excluding the control panel 6 region. As shown in FIGS. 2 and 3, the main cover body 80 includes an opposing surface 80a that opposes the document bed 4a when the document cover 5 is closed; an outer wall 81 protruding from peripheral edges of the opposing surface 80a at a right angle to the opposing surface 80a; and a plurality of reinforcing ribs 82 erected on the opposing surface 80a and arranged linearly in the left-to-right direction and the front-to-rear direction, forming a lattice construction, and diagonally between intersecting points of the lattice. Cylindrical parts 83 (and the pressing parts 84) are erected at each intersecting point of the reinforcing ribs 82.

Two of the cylindrical parts 83 are marked with the reference numeral 84 in FIG. 4. These cylindrical parts protrude farther toward the viewer of the drawing in FIG. 4 than the other cylindrical parts 83 (see FIG. 6) and function as the pressing parts 84 for pressing the pressing plate 90. The pair of pressing parts 84 is positioned along a centerline L1 that runs through the approximate front-to-rear center of the opposing region E, and each pressing parts 84 is positioned at equal distances from a centerline L2 that runs through the left-to-right center of the opposing region E.

A pair of engaging recessed parts 85 is integrally formed on the opposing surface 80a along a line parallel to the centerline L1 and at positions near the hinges 14. The engaging recessed parts 85 function to position the pressing plate 90 on the main cover body 80.

Figure 6:
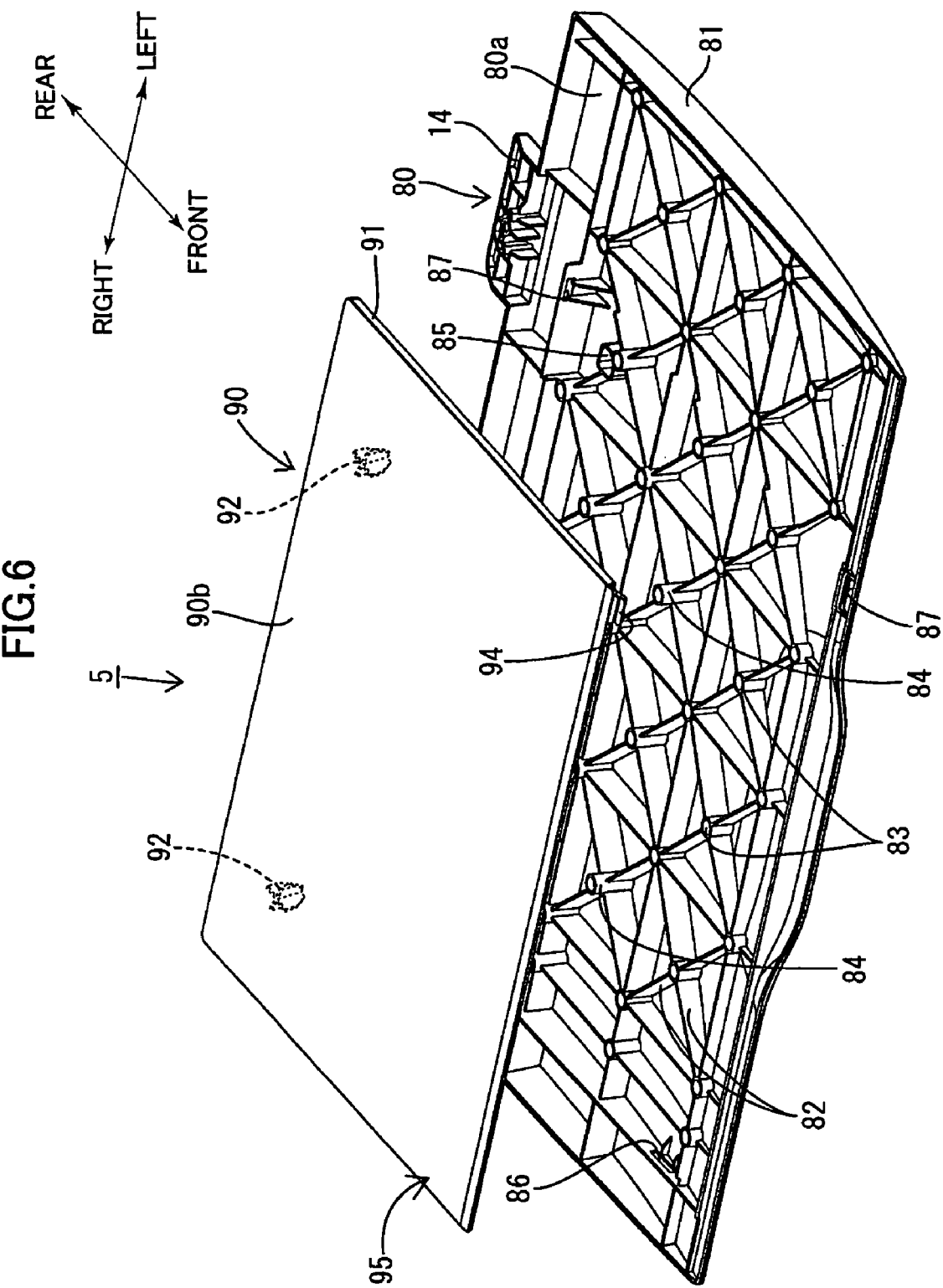
FIG. 6 is a perspective view of the pressing plate an the main cover body before the pressing plate is attached to the main cover body.
Figure 7:
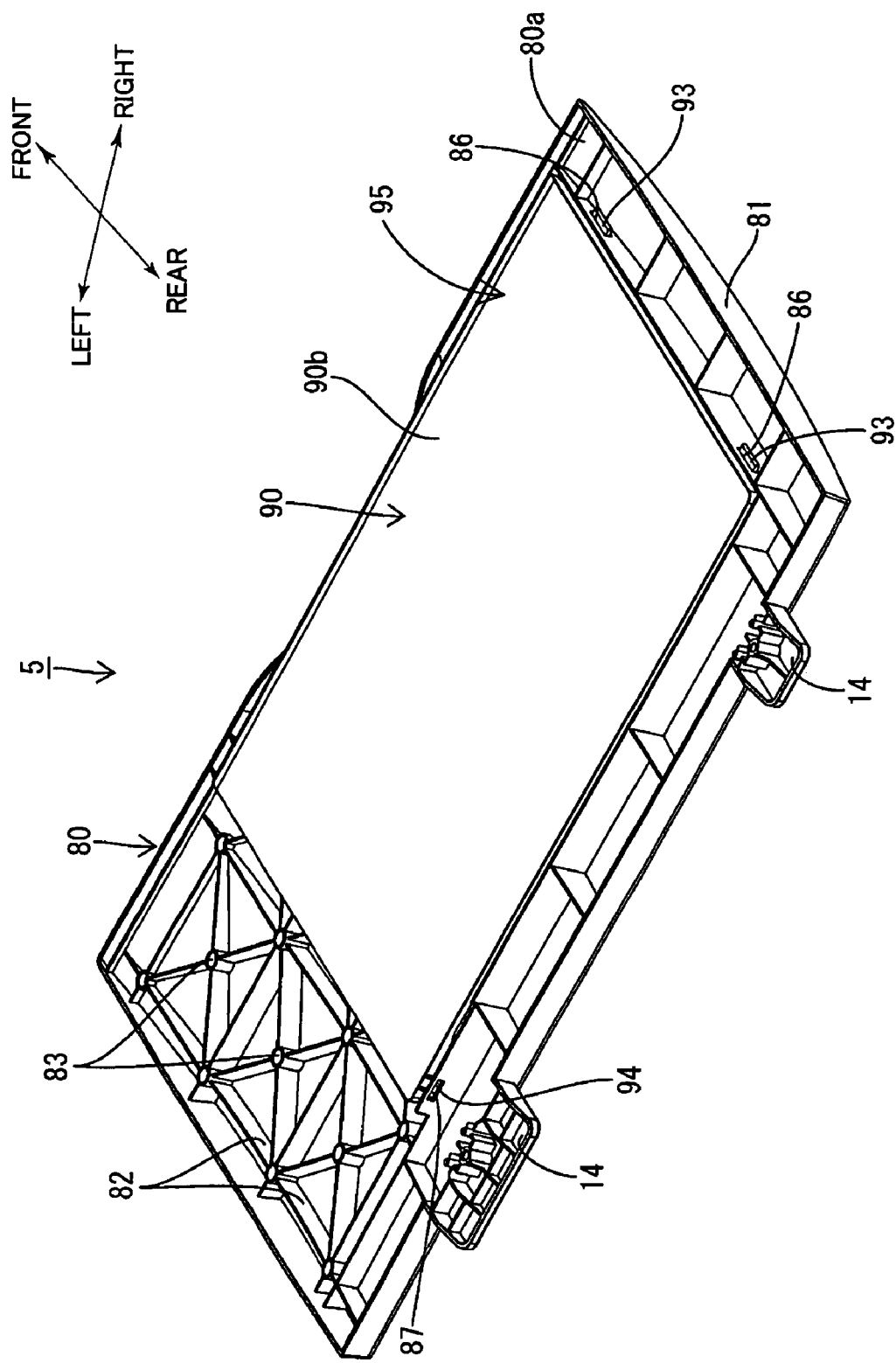
FIG. 7 is a perspective view of the pressing plate and the cover member after the pressing plate has been attached to the main cover body.

The main cover body 80 is also provided with parts for supporting the pressing plate 90 at each of the four corners of the opposing region E. Specifically, as shown in FIGS. 4, 6, and 7, a pair of rectangular through-holes 86 is formed in the reinforcing rib 82 positioned near the short side of the opposing region E on the right. A pair of rectangular through-holes 87 is also formed in other reinforcing ribs 82 positioned near the left end of both long sides of the opposing region E.

Figure 5:
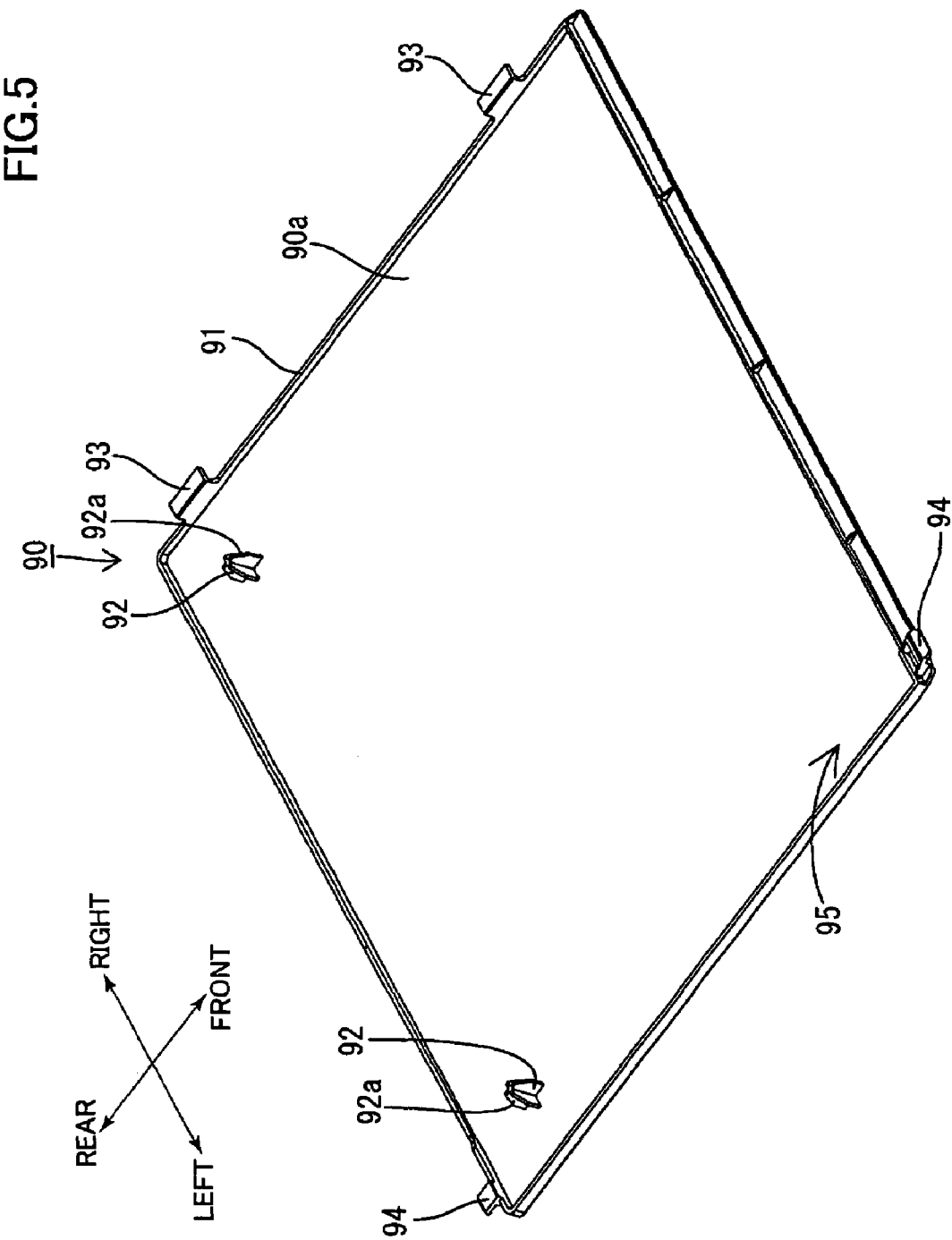
FIG. 5 is a perspective view of a pressing plate from the side opposing the main cover body.

FIG. 5 is a perspective view of the pressing plate 90 from the side that opposes the main cover body 80. The pressing plate 90 is also formed of a synthetic resin material. As shown in FIG. 5, the pressing plate 90 has a rectangular plate shape that extends in the left-to-right direction of the multifunction device 1 and has a size corresponding to the document bed 4a. The pressing plate 90 includes an opposing surface 90a that opposes the main cover body 80; an outer wall 91 erected from peripheral edges of the opposing surface 90a at a right angle to the opposing surface 90a; and engaging protrusions 92 formed integrally with the opposing surface 90a and protruding from the opposing surface 90a at positions corresponding to the pair of engaging recessed parts 85 on the main cover body 80 for fitting into the engaging recessed parts 85. A tapered surface 92a is formed on the end of each engaging protrusions 92 for facilitating the insertion of the engaging protrusions 92 into the engaging recessed parts 85.

Engaging pieces 93 are integrally provided on the right short side of the pressing plate 90 at positions corresponding to the through-holes 86 and are capable of being inserted into the through-holes 86 from the left side. Engaging pieces 94 are formed integrally with each long side of the pressing plate 90 near the left edge thereof at positions corresponding to the through-holes 87 and are capable of being inserted into the through-holes 87 in a horizontal direction.

With this construction, the pressing plate 90 can be engaged with the main cover body 80, as shown in FIG. 7, by inserting the engaging pieces 93 and 94 into the respective through-holes 86 and 87 with the pressing plate 90 in a slightly bowed state, while engaging the engaging protrusions 92 in the respective engaging recessed parts 85. At this time, contact between the engaging pieces 93 and the reinforcing rib 82 in which the through-holes 86 are formed restricts movement of the pressing plate 90 in the front-to-rear direction. Similarly, contact between the engaging pieces 94 and the reinforcing ribs 82 in which the through-holes 87 are formed restricts movement of the pressing plate 90 in the left-to-right direction.

Figure 8:
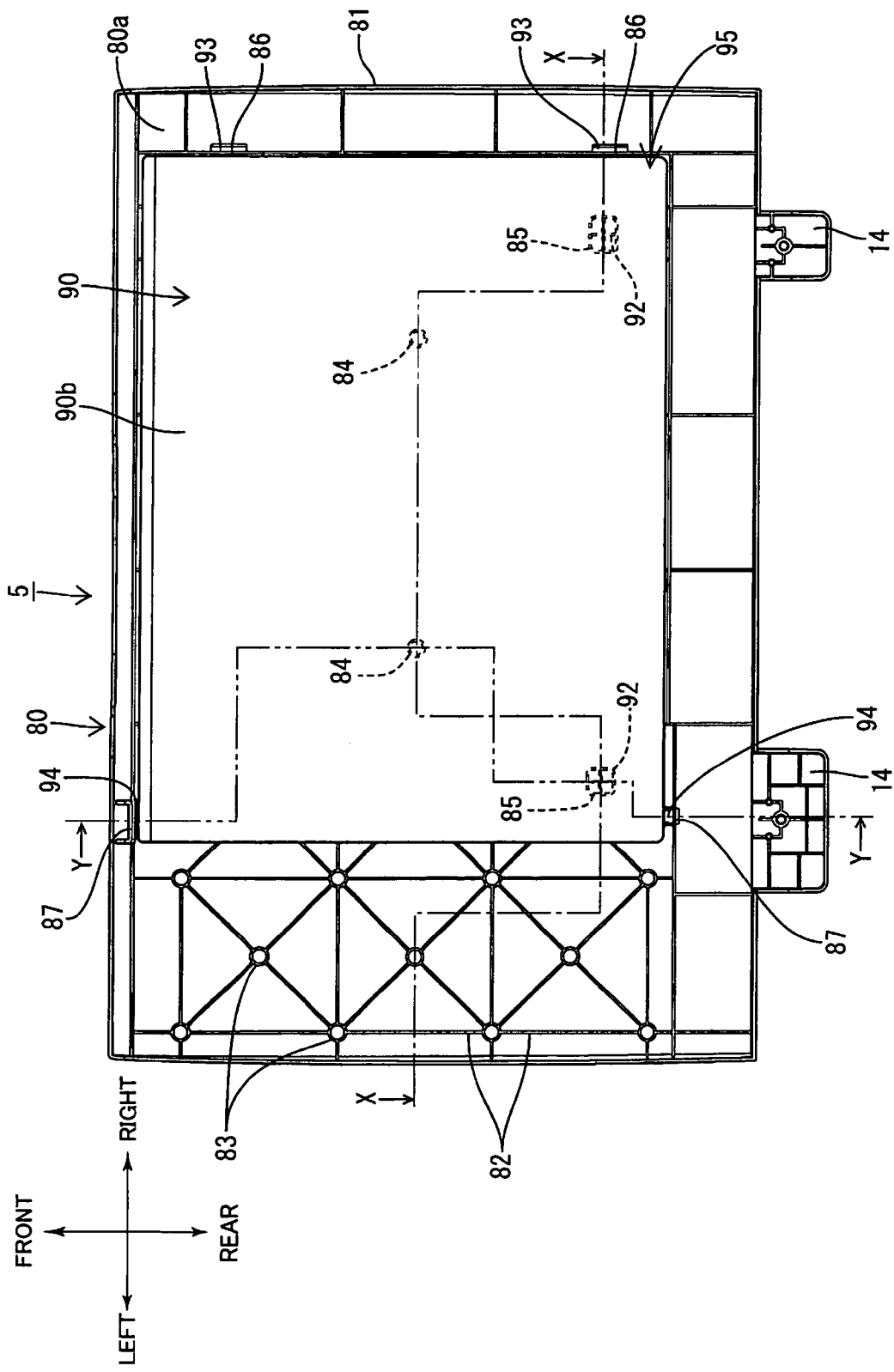
FIG. 8 is a plan view of the document cover from the pressing plate side.
Figure 9:
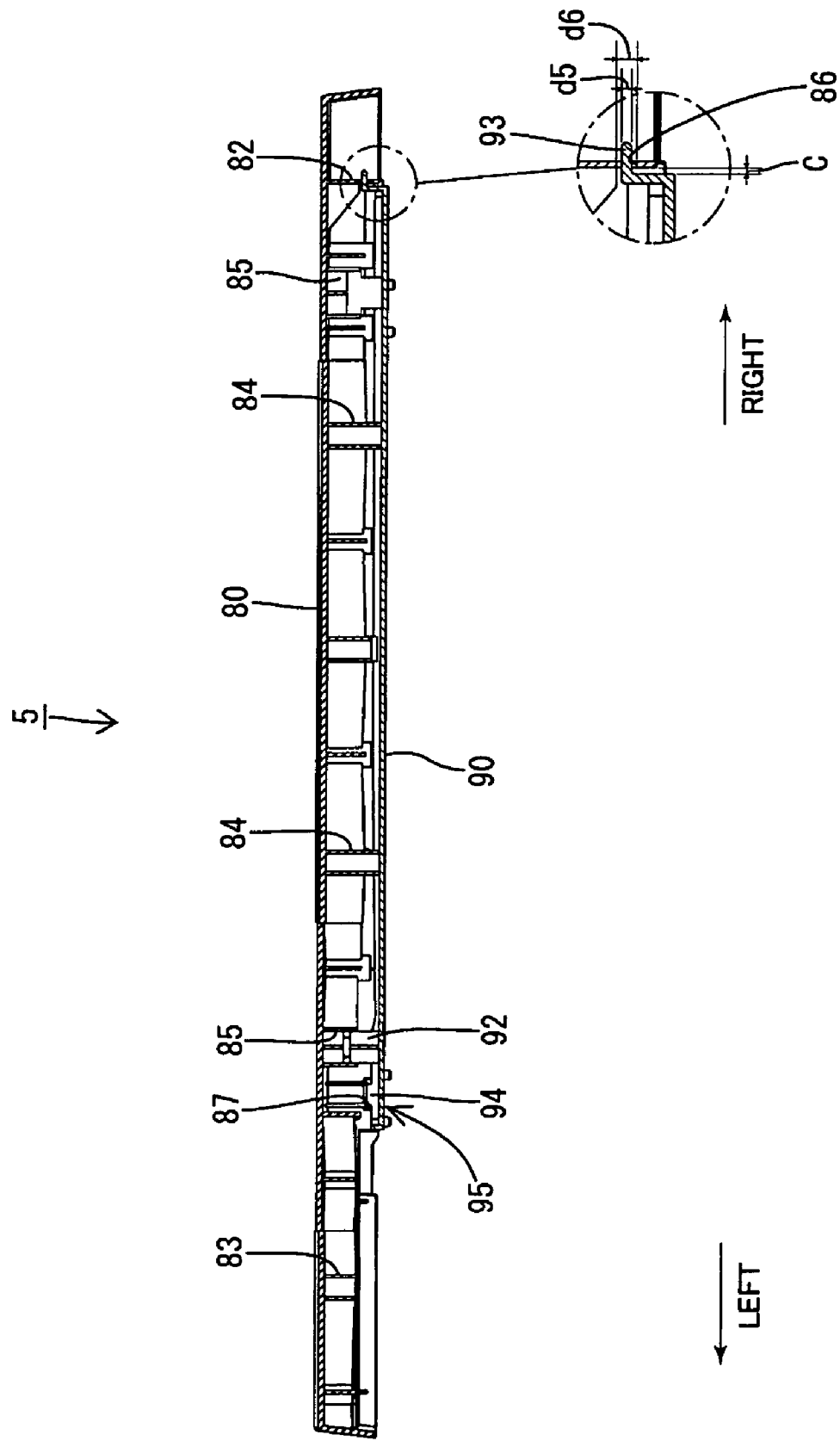
FIG. 9 is a cross-sectional view of the original cover along the line X-X in FIG. 8.
Figure 10:
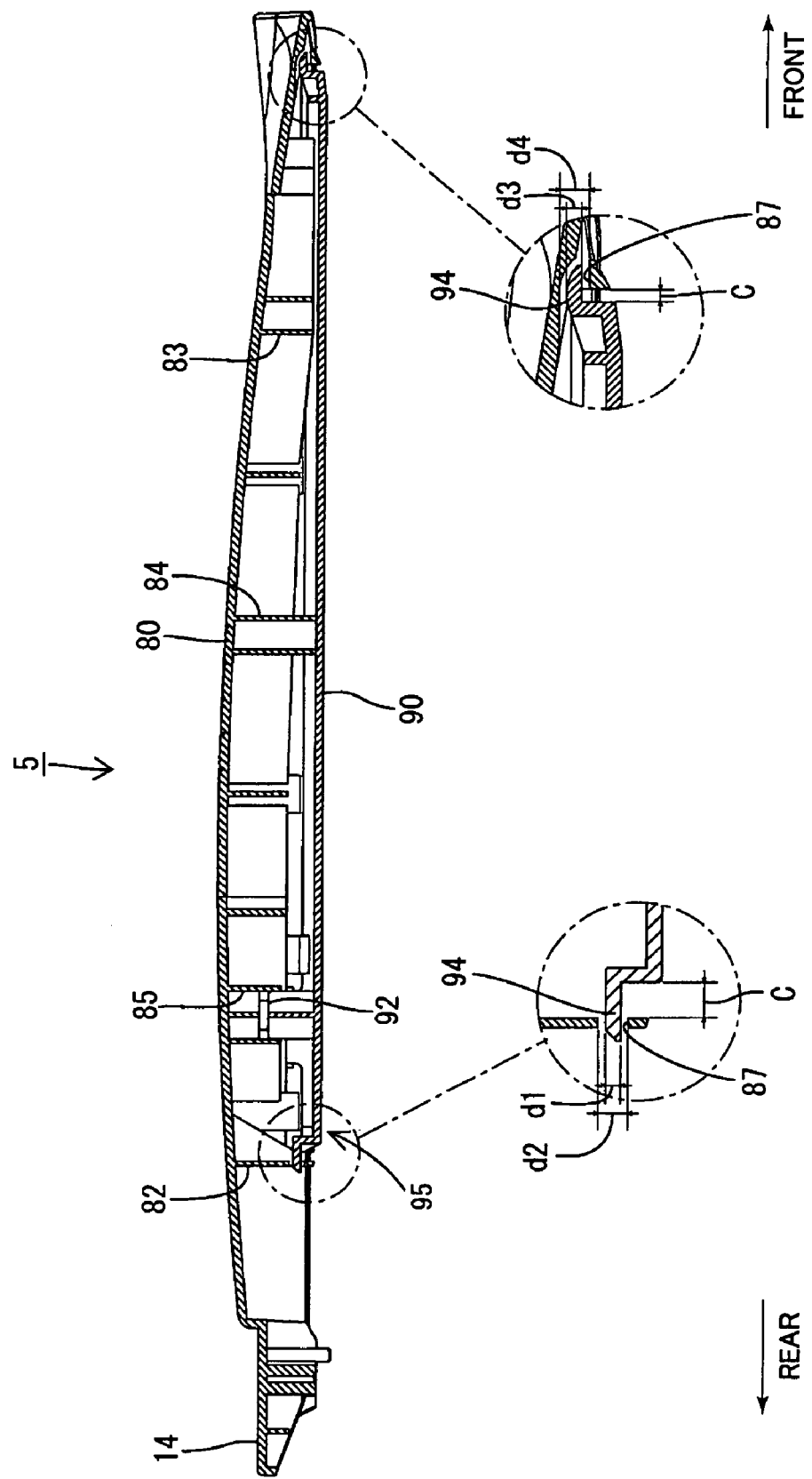
FIG. 10 is a cross-sectional view of the document cover along a line Y-Y in FIG. 8.

FIG. 8 is a plan view of the document cover 5 from the pressing plate 90 side. FIG. 9 is a cross-sectional view of the document cover 5 along a line X-X in FIG. 8. FIG. 10 is a cross-sectional view of the document cover 5 along a line Y-Y in FIG. 8.

As shown in FIGS. 9 and 10, opening widths d2, d4, and d6 formed in the through-holes 86 and 87 have a vertical dimension (the direction in which the main cover body 80 opposes the pressing plate 90) greater than widths d1, d3, and d5 of the engaging pieces 93 and 94. In other words, the pressing plate 90 engages with the main cover body 80 with some clearance in the vertical direction. Further, the engaging pieces 93 and 94 engage in the respective through-holes 86 and 87 with a clearance C in the engaging direction.

Figure 11:
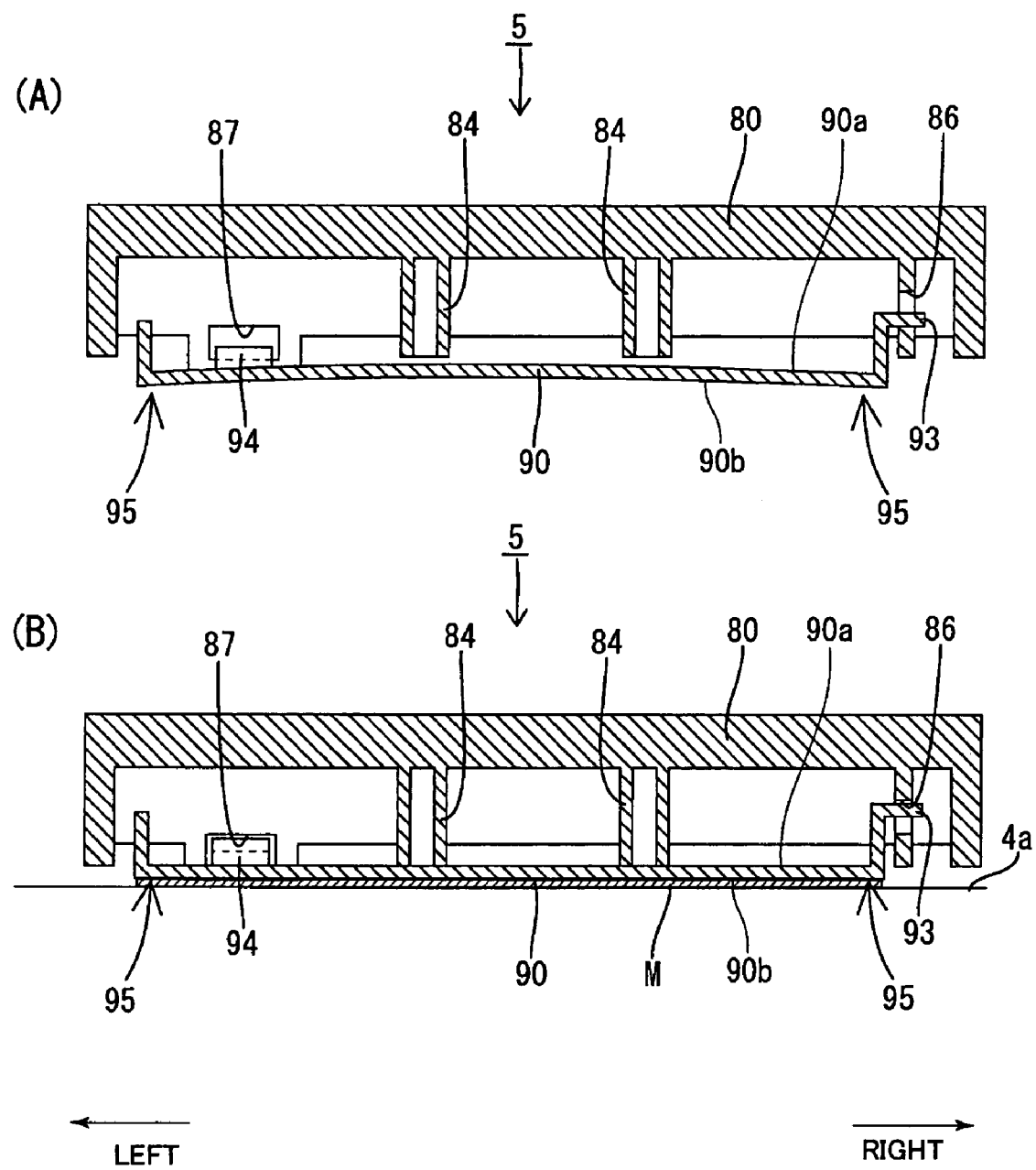
FIG. 11 is a schematic drawing illustrating the positional relationship between the main cover body and the pressing plate in the multifunction device.

FIG. 11 is a schematic drawing showing the main cover body 80 and the pressing plate 90, with FIG. 11(A) showing the document cover 5 in the open position of FIG. 2 and FIG. 11(B) showing the document cover 5 in the closed position of FIG. 1.

The pressing plate 90 is manufactured by injection molding of synthetic resin. Through the molding process, warpage is produced in the pressing plate 90 so that a center portion is depressed farther inward than peripheral parts 95 of the pressing plate 90. As shown in FIG. 11(A), the center part of the opposing surface 90a opposing the main cover body 80 in the pressing plate 90 of the preferred embodiment rises upward toward the main cover body 80 farther than the peripheral parts 95. Hence, the center part of an opposing surface 90b that opposes the document bed 4a is depressed farther than the peripheral parts 95. In the open position shown in FIG. 11(A), the pressing plate 90 is engaged with the main cover body 80 but is separated from the pressing parts 84 by its own weight.

When the document cover 5 is in the closed position shown in FIG. 11(B), the peripheral parts 95 of the pressing plate 90 contact the original M on the document bed 4a, while the pressing parts 84 contact and press the center part of the pressing plate 90 toward the document bed 4a. Accordingly, the pressing plate 90 can press the original M in a flat state along the surface of the document bed 4a.

According to the preferred embodiment, the pressing plate 90 formed of synthetic resin is supported with vertical clearance (in the direction orthogonal to the opposing surface 90b of the pressing plate 90) through the engagement of the engaging pieces 93 and 94 and the through-holes 86 and 87. Further, when the document cover 5 is in a closed position, the portion of the pressing plate 90 farther inward from the peripheral parts 95 is pressed toward the document bed 4a by the pressing parts 84. Accordingly, the pressing plate 90 can be given sufficient flexibility without using a pressing plate formed of the more expensive sponge material. Specifically, even when warpage is produced in the main cover body 80 or pressing plate 90, the pressing parts 84 can reliably press the center part of the pressing plate 90 against the document bed 4a using the clearance formed in the engaging parts, thereby ensuring that the original M is held tightly against the document bed 4a in a shape corresponding to the surface of the document bed 4a.

The pressing plate 90 is supported so that the center part of the pressing plate 90 opposing the main cover body 80 rises farther upward than the peripheral parts 95. Therefore, when the document cover 5 is in the closed position, the pressing parts 84 of the main cover body 80 press the raised center part toward the document bed 4a, thereby deforming the peripheral parts 95 into a shape that conforms to the surface of the document bed 4a and that enables the entire pressing plate 90 to press tightly against the original M.

As described above, the engaging pieces 93 and 94 are engaged in the through-holes 86 and 87 with a clearance C in the engaging direction. This clearance C allows the pressing plate 90 to be deformed as the document cover 5 is moved from the open position to the closed position in order to correct warpage in the pressing plate 90.

In the preferred embodiment, the engagement of the engaging pieces 93 and 94 with the through-holes 86 and 87 is implemented at each of the four corners of the pressing plate 90. This construction can support the pressing plate 90 on the main cover body 80 with more stability than a construction that supports the pressing plate at three locations or less.

Further, the engaging pieces 93 and 94 and the through-holes 86 and 87 function to position the pressing plate 90 relative to the main cover body 80, eliminating the need to provide separate parts for positioning the pressing plate 90.

Alternatively, a separate positioning member may be provided to ensure reliable positioning in association with the structure of the preferred embodiment described above.

As described above, the pressing parts 84 are positioned on the centerline L1 running through the approximate front-to-rear center of the opposing region E and are equidistant to the centerline L2 running through the left-to-right center of the opposing region E. Therefore, the pressing parts 84 can provide equal pressure to the rectangular pressing plate 90 so that the original M is reliably pressed tightly against the document bed 4a.

As described above, the engaging pieces 93 and 94 are integrally provided on the pressing plate 90, and the pressing parts 84 are integrally provided on the main cover body 80. This construction can reduce the number of required parts and can simplify the assembly operation by eliminating the need to insert screws, for example.

In the preferred embodiment described above, the pressing plate 90 can be securely positioned on the main cover body 80 by fitting the engaging protrusions 92 into the engaging recessed parts 85, thereby preventing play in the pressing plate 90 and ensuring that the original M is pressed firmly against the document bed 4a. Providing two sets of the engaging recessed parts 85 and engaging protrusions 92 at different positions can ensure more reliable positioning. In the preferred embodiment, the pressing plate 90 first contacts the document bed 4a from the hinges 14 side when the document cover 5 is rotated to the closed position. Therefore, smooth positioning can be achieved with the engaging recessed parts 85 and engaging protrusions 92 when performed near the hinges 14.

Since the engaging recessed parts 85 are formed integrally on the main cover body 80 and the engaging protrusions 92 are formed integrally on the pressing plate 90, the number of required parts can be reduced and the assembly operation can be simplified.

While the invention has been described in detail with reference to specific embodiments thereof, it would be apparent to those skilled in the art that many modifications and variations may be made therein without departing from the spirit of the invention, the scope of which is defined by the attached claims.

FIG. 12 is a perspective view of the pressing plate 90 according to a variation of the preferred embodiment from the side opposing the main cover body 80. The present variation differs from the preferred embodiment described above in that engaging protrusions 100 are provided at positions corresponding to the pressing parts 84 on the main cover body 80, and that the engaging protrusions 100 are fitted into the pressing parts 84. With this construction, the pressing parts 84 function both to press the pressing plate 90 and to position the pressing plate 90, thereby achieving a simpler construction than when these two functions are implemented with separate constructions and simplifying the assembly operation.

The pressing plate 90 can be positioned on the main cover body 80 with both side edges of the engaging piece 93 (edges along the short side of the pressing plate 90) near the hinges 14 placed in contact with the through-hole 86 and both edges of the engaging piece 94 (along the long side of the pressing plate 90) near the hinges 14 placed in contact with the through-hole 87, and without using the engaging recessed parts 85 and engaging protrusions 92. With this construction, the pressing plate 90 can be allowed to deform when the document cover 5 is closed, provided that clearance is formed between the through-holes 86 and 87 and the corresponding engaging pieces 93 and 94 on the side farthest from the hinges 14.

The scanning unit 3 may also be provided with an original tray on top of the document cover 5, and an automatic document feeder (ADF) for conveying an original document loaded in the original tray onto the document bed 4a.

Further, in the preferred embodiment described above, the through-holes 86 and 87 are formed on the main cover body 80 and the engaging pieces 93 and 94 are provided on the pressing plate 90. However, the engaging pieces may be provided on the main cover body 80 and the through-holes formed on the pressing plate 90 instead. Further, while the engaging recessed parts 85 are formed on the main cover body 80 and the engaging pieces 94 on the pressing plate 90 in the preferred embodiment described above, the engaging pieces may be provided on the main cover body 80 and the engaging recessed parts on the pressing plate 90 instead.

The document cover 5 may also be configured with the pressing parts 84 provided on the pressing plate 90 side. Further, the pressing parts may be provided at any positions, provided that the positions are symmetrical with respect to the centerlines L1 and L2. Further, the pressing plate 90 may be formed in a square shape.

In the preferred embodiment described above, the engagement between the engaging pieces 93 and 94 and the through-holes 86 and 87 is implemented at each of the four corners of the pressing plate 90. However, this engagement may be implemented at four locations on each of the long sides and short sides of the pressing plate 90. Further, the engagement is not restricted to the corners, but may be implemented at edge portions near the corners. Further, the recording medium employed in the multifunction device 1 is not limited to a recording medium formed of a paper material, but may also be a recording medium formed of a plastic material such as a transparency sheet. The multifunction device 1 described in the preferred embodiment may also be configured of a facsimile device or a multifunction device having a printer function, scanner, function, and the like.

What is claimed is:

1. An image reader comprising:
a main body having a document support surface for supporting an original document; and
a document cover having an edge portion rotatably supported on the main body and capable of rotating between a closed position for covering the document support surface and an open position for exposing the document support surface, wherein
the document cover comprises:
a main cover body;
a document pressing plate that is provided on an opposing surface of the main cover body that opposes the document support surface when the document cover is in the closed position, and document pressing plate having a pressing surface that opposes the document support surface when the document cover is in the closed position;
a supporting unit that supports the document pressing plate on the main cover body, the supporting unit comprising a first plurality of engaging protrusions provided on and being integrally formed on either one of the main cover body and the document pressing plate, and a first plurality of engagement receiving parts provided on the other of the main cover body and the document pressing plate for engaging with the first plurality of engaging protrusions with clearance in at least a direction orthogonal to the pressing surface, the supporting unit being free of a spring and a sponge; and a plurality of pressing parts disposed and integrally formed on at least one of the main cover body, in a region opposing the document pressing plate, and the document pressing plate, the plurality of pressing parts free of a spring and a sponge and pressing against the other of the main cover body and the document pressing plate in the direction that the main cover body and document pressing plate oppose one another when the document cover is in the closed position, the plurality of pressing parts separating from the other of the main cover body and the document pressing plate when the document cover is in the open position; wherein the first plurality of engaging protrusions protrude from at least one of the main cover body and the document pressing plate in a direction parallel to the pressing surface;

the first plurality of engagement receiving parts provided on the other of the main cover body and the document pressing plate are formed with through-holes; and the first plurality of engaging protrusions are engaged with the first plurality of engagement receiving parts through insertion into the through-holes of the first engagement receiving parts;

the document pressing plate being formed in the shape of a tetragon in which all corner angles are right angles and in which a pair of first sides extend parallel to each other in a first direction and a pair of second sides extend parallel to each other in a second direction orthogonal to the first direction;

the first plurality of engaging protrusions include two protrusions protruding from one of the second sides in the first direction and one protrusion protruding from one of the first sides in the second direction, respectively;

the first plurality of engagement receiving parts are formed of two receiving parts for engaging with the two first engaging protrusions;

the document pressing plate is restricted from moving in the second direction relative to the main cover body by the engagement of the first engaging protrusion protruding from one of the second sides in the first direction with the first engagement receiving part for engaging with the first engaging protrusion protruding from one of the second sides in the first direction; and the document pressing plate is restricted from moving in the first direction relative to the main cover body by the engagement of the first engaging protrusion protruding from one of the first sides in the second direction with the first engagement receiving part for engaging with the first engaging protrusion protruding from one of the first sides in the second direction.

2. The image reader according to claim 1, wherein the document pressing plate is formed from a synthetic resin.

3. The image reader according to claim 1, wherein the document pressing plate is warped so that a center part on the pressing surface side is depressed farther toward the main cover body than peripheral edges of the document pressing plate.

4. The image reader according to claim 1, wherein the first plurality of engaging protrusions and the first plurality of engagement receiving parts engage with clearance in a direction parallel to the pressing surface at least when the document cover is in the open position.

5. The image reader according to claim 1, wherein the document pressing plate is rectangular in shape; and
the supporting unit is provided in each of four corners of the rectangular shape.

6. The image reader according to claim 1, wherein the first plurality of engagement receiving parts are integrally formed on the other of the main cover body and the document pressing plate.

7. The image reader according to claim 1, further comprising a positioning unit that restricts movement of the document pressing plate relative to the main cover body in a direction parallel to the pressing surface;
wherein the positioning unit comprises a second plurality of engaging protrusions provided on one of the main cover body and the document pressing plate for protruding in the direction that the main cover body and the document pressing plate opposes each other; and
a second plurality of engagement receiving parts provided on the other of the main cover body and the document pressing plate for fitting over the second plurality of engaging protrusions.

8. The image reader according to claim 7, wherein the second plurality of engaging protrusions and the second plurality of engagement receiving parts are provided in two sets at different positions on the main cover body and the document pressing plate, with members of each set corresponding to one another.

9. The image reader according to claim 7, wherein the plurality of pressing parts function as the second plurality of engagement receiving parts.

10. The image reader according to claim 7, wherein the second plurality of engaging protrusions are integrally provided on one of the main cover body and the document pressing plate, and the second plurality of engagement receiving parts are integrally provided on the other.

11. The image reader according to claim 1, wherein
the plurality of pressing parts are provided along a centerline running between either the pair of first sides or the pair of second sides.

12. The image reader according to claim 1, wherein the document pressing plate is rectangular shaped and has a pair of long sides extending parallel to each other and a pair of short sides extending parallel to each other; and
two of the pressing parts are provided along a centerline extending between the pair of long sides, with one on either side of the centerline between the pair of short sides, such that a distance between one of the pressing parts and the short side adjacent to the same pressing part is equal to the distance between the other pressing part and the short side adjacent to the other pressing part.

13. The image reader according to claim 12, wherein the distance between one of the pressing parts and the short side adjacent to the same pressing part is equal to the distance between one of the long sides and the centerline running between the pair of long sides; and
the distance between the other pressing part and the other short side adjacent to the other pressing part is equal to the distance between one of the long sides and the centerline running between the pair of long sides.

14. The image reader according to claim 1, further comprising a light source for image reading disposed in the main body.

15. An image-forming device comprising:
an image reader according to claim 1; and
an image-forming unit that forms images on a recording medium based on image data read by the image reader.

16. An image reader comprising:
a main body having a document support surface for supporting an original document; and
a document cover having an edge portion rotatably supported on the main body and capable of rotating between a closed position for covering the document support surface and an open position for exposing the document support surface, wherein the document cover comprises:
- a main cover body;
- a document pressing plate that is provided on an opposing surface of the main cover body that opposes the document support surface when the document cover is in the closed position, and document pressing plate having a pressing surface that opposes the document support surface when the document cover is in the closed position;
- a supporting unit that supports the document pressing plate on the main cover body, the supporting unit comprising a first plurality of engaging protrusions provided on and being integrally formed on either one of the main cover body and the document pressing plate, and a first plurality of engagement receiving parts provided on the other of the main cover body and the document pressing plate for engaging with the first plurality of engaging protrusions with clearance in at least a direction orthogonal to the pressing surface; and
- a plurality of pressing parts disposed and integrally formed on at least one of the main cover body, in a region opposing the document pressing plate, and the document pressing plate, the plurality of pressing parts free of a spring and a sponge and pressing against the other of the main cover body and the document pressing plate in the direction that the main cover body and document pressing plate oppose one another when the document cover is in the closed position, the plurality of pressing parts separating from the other of the main cover body and the document pressing plate when the document cover is in the open position;

the document pressing plate being formed in the shape of a tetragon in which all corner angles are right angles and in which a pair of first sides extend parallel to each other in a first direction and a pair of second sides extend parallel to each other in a second direction orthogonal to the first direction;

the first plurality of engaging protrusions include two protrusions protruding from one of the second sides in the first direction and one protrusion protruding from one of the first sides in the second direction, respectively;

the first plurality of engagement receiving parts are formed of two receiving parts for engaging with the two first engaging protrusions;

the document pressing plate is restricted from moving in the second direction relative to the main cover body by the engagement of the first engaging protrusion protruding from one of the second sides in the first direction with the first engagement receiving part for engaging with the first engaging protrusion protruding from one of the second sides in the first direction; and the document pressing plate is restricted from moving in the first direction relative to the main cover body by the engagement of the first engaging protrusion protruding from one of the first sides in the second direction with the first engagement receiving part for engaging with the first engaging protrusion protruding from one of the first sides in the second direction.

17. An image reader comprising:

a main body having a document support surface for supporting an original document; and a document cover having an edge portion rotatably supported on the main body and capable of rotating between a closed position for covering the document support surface and an open position for exposing the document support surface, wherein the document cover comprises:
- a main cover body;
- a document pressing plate that is provided on an opposing surface of the main cover body that opposes the document support surface when the document cover is in the closed position, and document pressing plate having a pressing surface that opposes the document support surface when the document cover is in the closed position;
- a supporting unit that supports the document pressing plate on the main cover body, the supporting unit comprising a first plurality of engaging protrusions provided on either one of the main cover body and the document pressing plate, and a first plurality of engagement receiving parts provided on the other of the main cover body and the document pressing plate for engaging with the first plurality of engaging protrusions with clearance in at least a direction orthogonal to the pressing surface, the supporting unit being free of a spring and a sponge; and
- a plurality of pressing parts disposed and integrally formed on at least one of the main cover body, in a region opposing the document pressing plate, and the document pressing plate, the plurality of pressing parts free of a spring and a sponge and pressing against the other of the main cover body and the document pressing plate in the direction that the main cover body and document pressing plate oppose one another when the document cover is in the closed position;

the document pressing plate being formed in the shape of a tetragon in which all corner angles are right angles and in which a pair of first sides extend parallel to each other in a first direction and a pair of second sides extend parallel to each other in a second direction orthogonal to the first direction;

the first plurality of engaging protrusions include two protrusions protruding from one of the second sides in the first direction and one protrusion protruding from one of the first sides in the second direction, respectively;

the first plurality of engagement receiving parts are formed of two receiving parts for engaging with the two first engaging protrusions;

the document pressing plate is restricted from moving in the second direction relative to the main cover body by the engagement of the first engaging protrusion protruding from one of the second sides in the first direction with the first engagement receiving part for engaging with the first engaging protrusion protruding from one of the second sides in the first direction; and the document pressing plate is restricted from moving in the first direction relative to the main cover body by the engagement of the first engaging protrusion protruding from one of the first sides in the second direction with the first engagement receiving part for engaging with the first engaging protrusion protruding from one of the first sides in the second direction.

18. An image reader comprising:

a main body having a document support surface for supporting an original document; and a document cover having an edge portion rotatably supported on the main body and capable of rotating between a closed position for covering the document support surface and an open position for exposing the document support surface, wherein the document cover comprises:

a main cover body;

a document pressing plate that is provided on an opposing surface of the main cover body that opposes the document support surface when the document cover is in the closed position, and document pressing plate having a pressing surface that opposes the document support surface when the document cover is in the closed position;

a supporting unit that supports the document pressing plate on the main cover body, the supporting unit comprising a first plurality of engaging protrusions provided on either one of the main cover body and the document pressing plate, and a first plurality of engagement receiving parts provided on the other of the main cover body and the document pressing plate for engaging with the first plurality of engaging protrusions with clearance in at least a direction orthogonal to the pressing surface; and a plurality of pressing parts disposed and integrally formed on at least one of the main cover body, in a region opposing the document pressing plate, and the document pressing plate, the plurality of pressing parts free of a spring and a sponge and pressing against the other of the main cover body and the document pressing plate in the direction that the main cover body and document pressing plate oppose one another when the document cover is in the closed position; wherein the first plurality of engaging protrusions protrude from at least one of the main cover body and the document pressing plate in a direction parallel to the pressing surface;

the first plurality of engagement receiving parts provided on the other of the main cover body and the document pressing plate are formed with through-holes; and the first plurality of engaging protrusions are engaged with the first plurality of engagement receiving parts through insertion into the through-holes of the first engagement receiving parts;

the document pressing plate being formed in the shape of a tetragon in which all corner angles are right angles and in which a pair of first sides extend parallel to each other in a first direction and a pair of second sides extend parallel to each other in a second direction orthogonal to the first direction;

the first plurality of engaging protrusions include two protrusions protruding from one of the second sides in the first direction and one protrusion protruding from one of the first sides in the second direction, respectively;

the first plurality of engagement receiving parts are formed of two receiving parts for engaging with the two first engaging protrusions;

the document pressing plate is restricted from moving in the second direction relative to the main cover body by the engagement of the first engaging protrusion protruding from one of the second sides in the first direction with the first engagement receiving part for engaging with the first engaging protrusion protruding from one of the second sides in the first direction; and the document pressing plate is restricted from moving in the first direction relative to the main cover body by the engagement of the first engaging protrusion protruding from one of the first sides in the second direction with the first engagement receiving part for engaging with the first engaging protrusion protruding from one of the first sides in the second direction.

* * * * *